(12) United States Patent
Kreizel

(10) Patent No.: US 6,360,484 B1
(45) Date of Patent: Mar. 26, 2002

(54) PLANTER AND METHOD OF MANUFACTURING SAME

(75) Inventor: James Kreizel, Hewlett, NY (US)

(73) Assignee: Dynamic Design, Inc., East Elmhurst, NY (US)

( * ) Notice: Subject to any disclaimer, the term of this patent is extended or adjusted under 35 U.S.C. 154(b) by 0 days.

(21) Appl. No.: 09/567,781

(22) Filed: May 9, 2000

(51) Int. Cl.[7] ................................................ A01G 9/02
(52) U.S. Cl. ........................ 47/65.5; 47/66.1; 47/66.7; 47/30
(58) Field of Search .......................... 47/65.5, 71, 66.7, 47/29.2, 30, 66.1

(56) References Cited

U.S. PATENT DOCUMENTS

| | | |
|---|---|---|
| 1,557,712 A | 10/1925 | Little |
| 1,778,150 A | 10/1930 | Freeburg |
| 2,738,621 A | 3/1956 | Abbrecht |
| 2,785,508 A * | 3/1957 | Coleman, Jr. .................. 47/70 |
| 2,790,269 A | 4/1957 | Coleman, Jr. |
| 3,079,037 A | 2/1963 | Schechter |
| 3,415,011 A | 12/1968 | Hornbostel, Jr. |
| 3,704,545 A * | 12/1972 | Reisen ........................... 47/69 |
| 3,961,443 A * | 6/1976 | Insalaco ........................ 47/32 |
| 4,070,794 A | 1/1978 | Gibbs |
| 4,145,841 A * | 3/1979 | Woolpert ..................... 47/66.1 |
| 4,369,598 A * | 1/1983 | Beckwith ....................... 47/61 |
| 4,706,833 A * | 11/1987 | Korcz et al. ................. 220/613 |
| 4,791,754 A * | 12/1988 | Demars, Jr. .................... 47/29 |
| 4,835,834 A | 6/1989 | Weder |
| 4,901,423 A | 2/1990 | Weder |
| 4,980,209 A * | 12/1990 | Hill ........................... 428/34.1 |
| 4,995,192 A * | 2/1991 | DeWid .......................... 47/30 |
| 5,077,937 A | 1/1992 | Weder et al. |
| 5,105,599 A | 4/1992 | Weder |
| 5,184,390 A | 2/1993 | Weder |
| 5,274,900 A | 1/1994 | Weder |
| 5,353,546 A | 10/1994 | Bock |
| 5,477,640 A | 12/1995 | Holtkamp, Jr. |
| 5,535,548 A | 7/1996 | Weder et al. |
| 5,551,140 A | 9/1996 | Weder et al. |
| 5,561,894 A | 10/1996 | Weder et al. |
| 5,566,439 A | 10/1996 | Weder |
| 5,781,981 A | 7/1998 | Weder et al. |
| 5,782,453 A | 7/1998 | Tuzza et al. |
| 6,161,332 A * | 12/2000 | Avot ............................. 47/81 |
| 6,170,144 B1 * | 1/2001 | Phillipson .................... 29/453 |

FOREIGN PATENT DOCUMENTS

| | | | | |
|---|---|---|---|---|
| DE | 2725446 | * | 12/1978 | ................. 47/65.5 |
| DE | 3931464 | * | 9/1989 | ............ A01G/9/02 |
| EP | 1110870 | * | 6/2001 | ............ B65D/1/46 |
| GB | 2349790 | * | 11/2000 | ............ A01G/9/02 |

* cited by examiner

Primary Examiner—Peter M. Poon
Assistant Examiner—Son T Nguyen
(74) Attorney, Agent, or Firm—Dilworth & Barrese, LLP

(57) ABSTRACT

A decorative planter includes a base having upper and lower portions and a flange disposed about the outer periphery of the upper portion. The planter also includes a collar dimensioned to encompass the upper portion of the base. The collar has a mechanical interface which engages the flange such that the collar and the flange form a decorative rim about the upper portion of the planter. The present disclosure also relates to a method of forming a decorative planter which includes the steps of: a) forming a base having upper and lower portions and a flange disposed about the outer periphery of the upper portion; b) forming a collar dimensioned to encompass the upper portion of the base, the collar having a mechanical interface dimensioned to mechanically engage the flange; and c) engaging the collar and the flange to form a decorative rim about the upper portion of the base.

15 Claims, 5 Drawing Sheets

PLANTER AND METHOD OF MANUFACTURING SAME

BACKGROUND

1. Field of the Disclosure

The present disclosure relates to planters and more particularly to a planter which is manufactured in two pieces to simplify and reduce the overall cost of the manufacturing process. The two pieces are then assembled to form a decorative planter.

2. Description of Related Art

Planters or flower pots have long been a part of the horticultural industry and are typically used to grow plants, flowers and vegetables in a protected and easily maintainable environment. Planter manufacturers over the years have reaped the benefits of widespread use of planters in homes and gardens and, more recently, have enjoyed a surge in the industry due to the increased use of lighter, more decorative plastics as the material of choice for the planters. These plastics can be formed to have complex patterns and shapes and can be colored to imitate marble, terracotta and concrete planters.

The cost of manufacturing more decorative planters are high due to the complexity of forming the molds and/or extruding the plastic into many of the more desirable patterns and planter shapes. For example, in order to manufacture many of the more complex, i.e., more decorative, planters, manufacturers need to implement manufacturing steps which require rolling and setting/securing the outer decorative rim of the planter against the base to form a uniform-looking planter. As can be appreciated, these additional aesthetic-enhancing step tends to be quite costly and time consuming.

As a result, a continuing need exists for ways to manufacture decorative planters in a more cost effective manner. However, for the most part, many of the known manufacturing techniques are overly complicated, labor intensive and/or require expensive equipment to make the planters. Thus, there exists a need to develop a decorative planter which can be easily and economically manufactured without relying on expensive manufacturing equipment and/or overly complicated manufacturing techniques.

SUMMARY

The present disclosure relates to a planter which includes a base having upper and lower portions and a flange disposed about the outer periphery of the upper portion. The planter also includes a collar which is dimensioned to encompass the upper portion of the base and a mechanical interface associated with the collar which is dimensioned to mechanically engage the flange such that the collar and the flange form a decorative rim about the upper portion of the base. Preferably, the base and the collar are annular in shape.

In one embodiment, the collar mechanically engages the flange in a snap-fit manner. For example, the flange may include a lip which projects outwardly therefrom to define a groove between the flange and the lip. The groove is dimensioned to mechanically engage a corresponding rib extending from the collar.

Another feature of the presently disclosed planter includes a brace which holds the collar in engagement against the base. Preferably, the base includes a chamfered section disposed about the outer periphery thereof and the brace biases the collar against the chamfered section to secure the collar in mechanical engagement with the flange, i.e., secure the rib extending from the collar within the groove.

Another feature of the presently disclosed planter includes a plurality of support struts which are disposed about the outer periphery of the base between the base and the flange which provides strength and stability to the decorative rim once assembled.

The present disclosure also relates to a method of forming a planter, which includes the steps of: a) forming a base having upper and lower portions and a flange disposed about the outer periphery of the upper portion; b) forming a collar dimensioned to encompass the upper portion of the base, the collar having a mechanical interface dimensioned to mechanically engage the flange; and c) engaging the collar and the flange to form a decorative rim about the upper portion of the base.

Preferably, at least one of the first and/or second forming steps includes a molding process, e.g., injection or thermal molding. In one method, the second forming step includes a molding process and the engaging step is performed prior to the collar being completely cured which is believed to augment the mechanical interface between the collar and the base.

BRIEF DESCRIPTION OF THE DRAWINGS

Preferred embodiments of the presently disclosed planter and method of manufacturing same are described herein with reference to the drawings wherein.

DETAILED DESCRIPTION OF PREFERRED EMBODIMENTS

Figure 1:
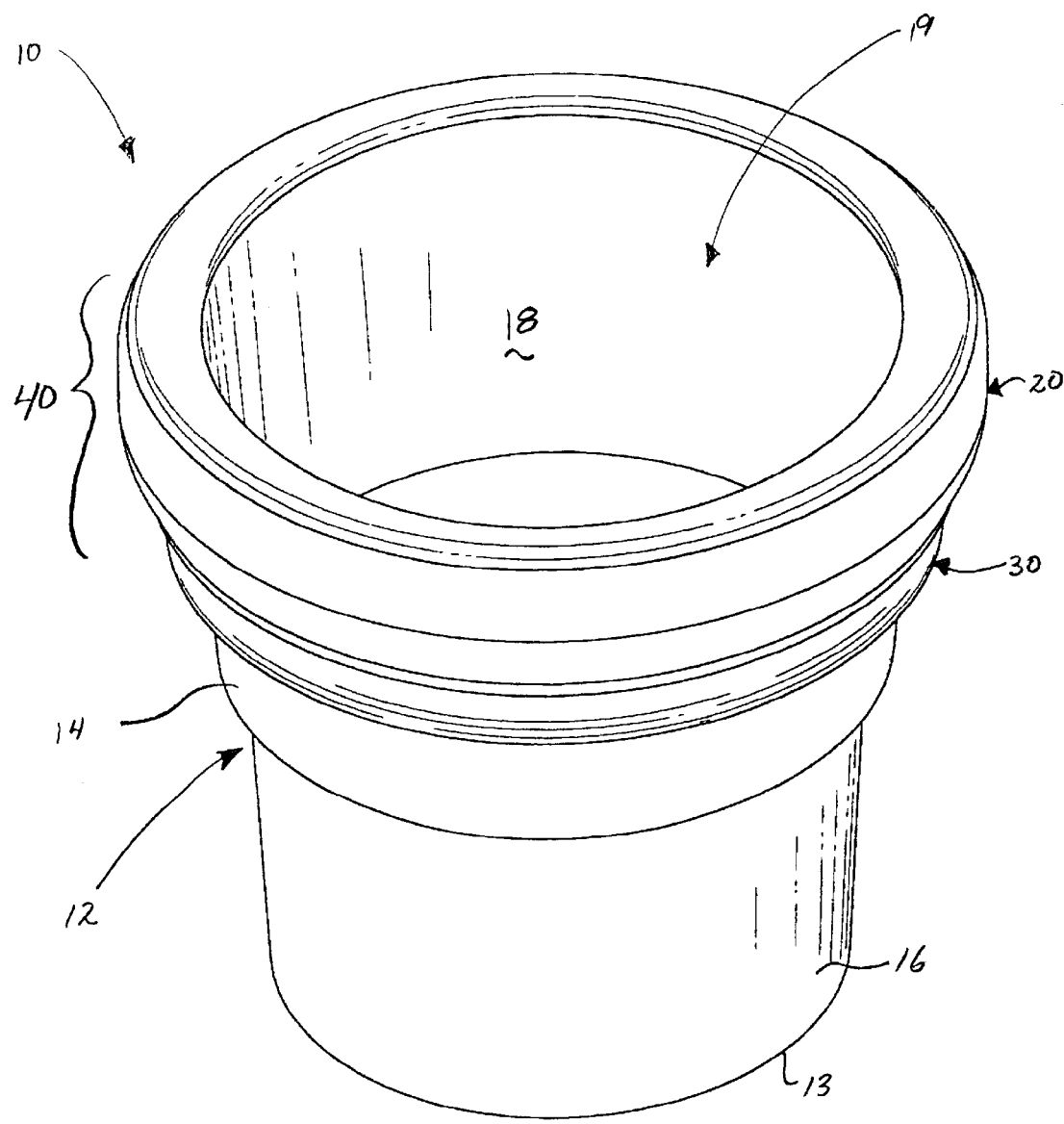
FIG. 1 is a top, perspective view of one illustrative embodiment of a decorative planter constructed in accordance with the present disclosure having a base and a collar.

Referring now in specific detail to the drawings in which like reference numerals identify similar or identical components throughout several views, and initially to FIG. 1 there is illustrated one embodiment of a planter constructed in accordance with the principles of the present disclosure generally identified by reference numeral 10. Planter 10 includes a base 12 having a bottom portion 13, upper and lower portions 14 and 16, respectively, and a flange 20 disposed along the top edge of upper portion 14. Planter 10 also includes a selectively engageable collar 30 which engages the flange 20 such that, when assembled, the flange 20 and collar 30 form a decorative rim 40 disposed about the outer periphery of upper portion 14 of base 12. It is envisioned that base 10 is generally annular in shape such that an inner periphery 18 thereof defines an annular opening 19 for receiving a plant, flower, vegetable or the like. However, other geometrical shapes are also within the scope of the present disclosure.

Figure 5B:
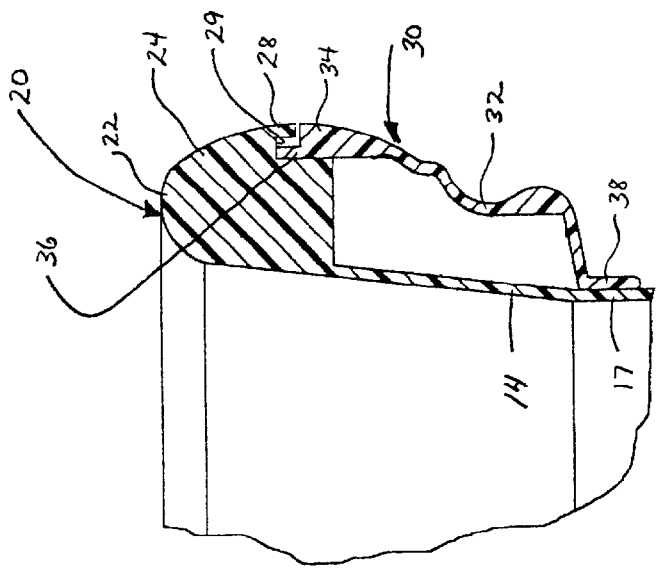
FIG. 5B is an enlarged, sectional view of the area of detail in FIG. 5A showing the collar engaged with the flange to form a decorative rim about the outer periphery of the planter.

As best shown in FIGS. 2, 3, 4 and 5B, flange 20 has a generally inverted J-shaped cross section. More particularly, flange 20 includes a top surface 22 which projects generally radially from the upper portion 14 of base 12 and a side overhang 24 which depends downwardly from the outermost edge of top surface 22. FIG. 5B shows an enlarged view of the flange 20 and details a lip 28 which extends from side overhang 24 to define a groove 29 between the lip 28 and the flange 20. As explained in more detail below, groove 29 engages a corresponding rib 36 which projects from collar 30 to secure the collar 30 to the base 12.

Figure 2:
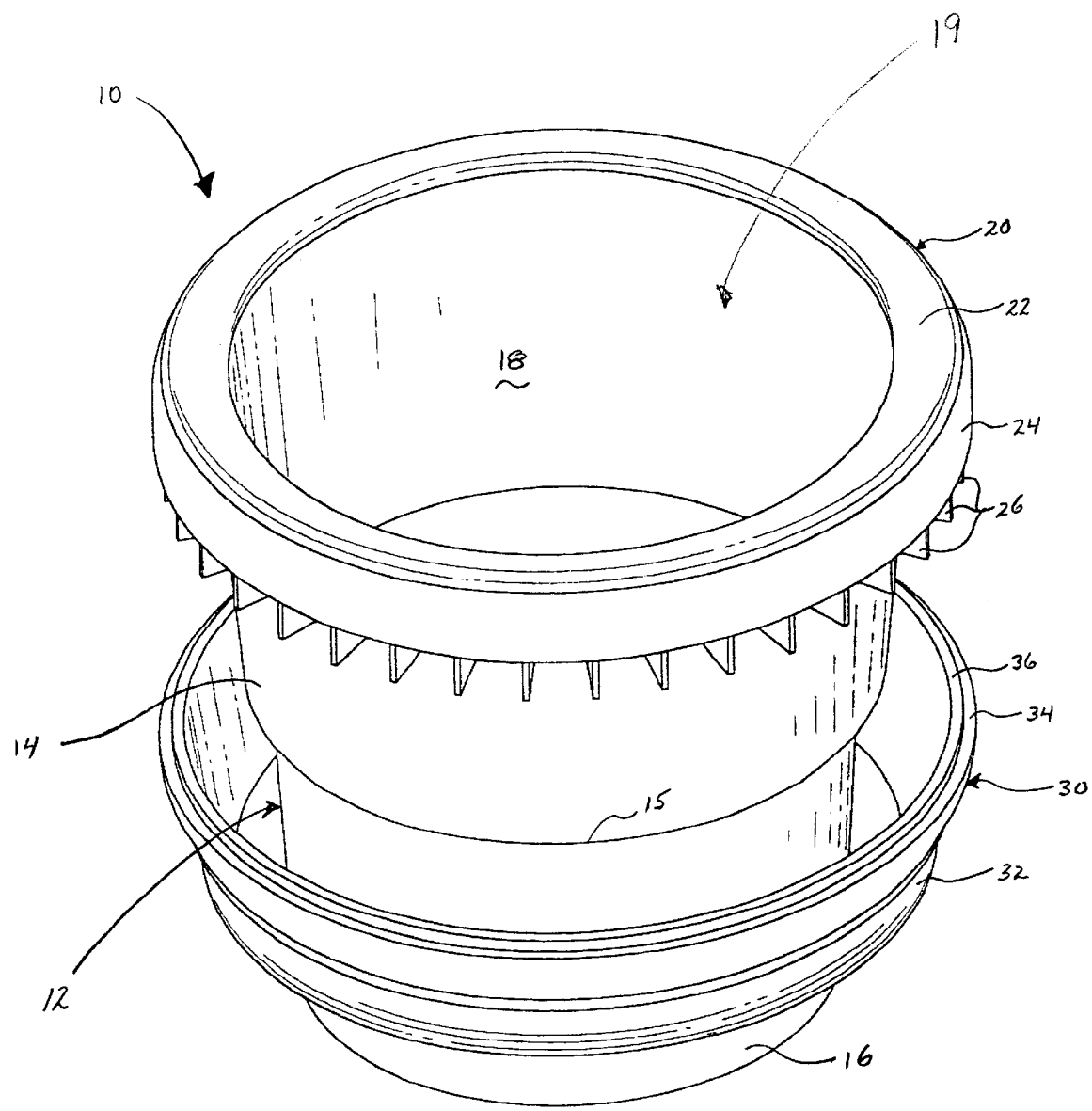
FIG. 2 is a top, perspective view of the decorative planter of FIG. 1 shown with parts separated.
Figure 3:
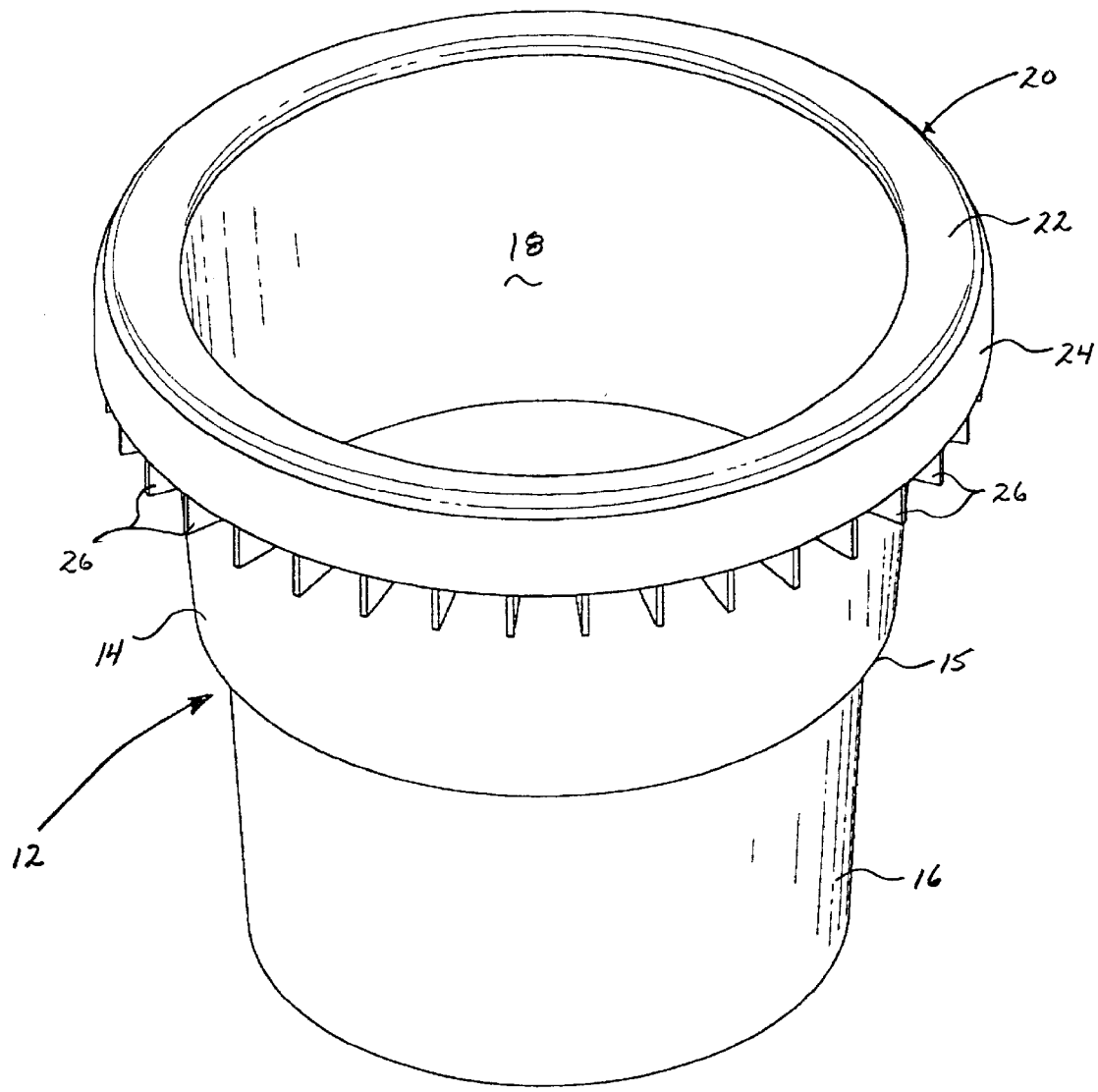
FIG. 3 is a top, perspective view of the base portion showing a plurality of support struts disposed about the outer periphery thereof.
Figure 4:
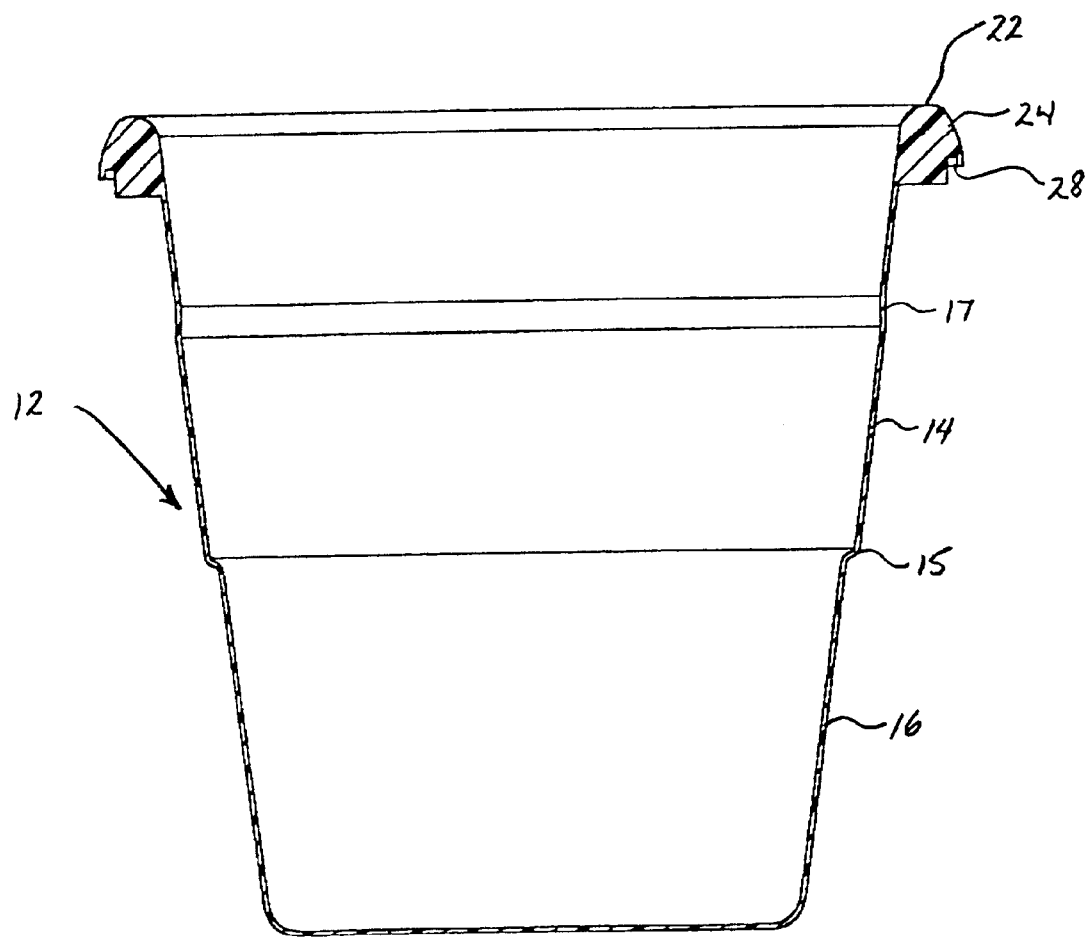
FIG. 4 is front, sectional view of the base showing a flange projecting outwardly therefrom.

FIGS. 2 and 3 illustrate one particular embodiment of the planter 10 which includes a plurality of support struts 26 which project outwardly from the base 12 between the overhang 24 and the flange 20. Preferably, support struts 26 provide additional stability and strength to the decorative rim 40 when completely assembled as described below.

Figure 5A:
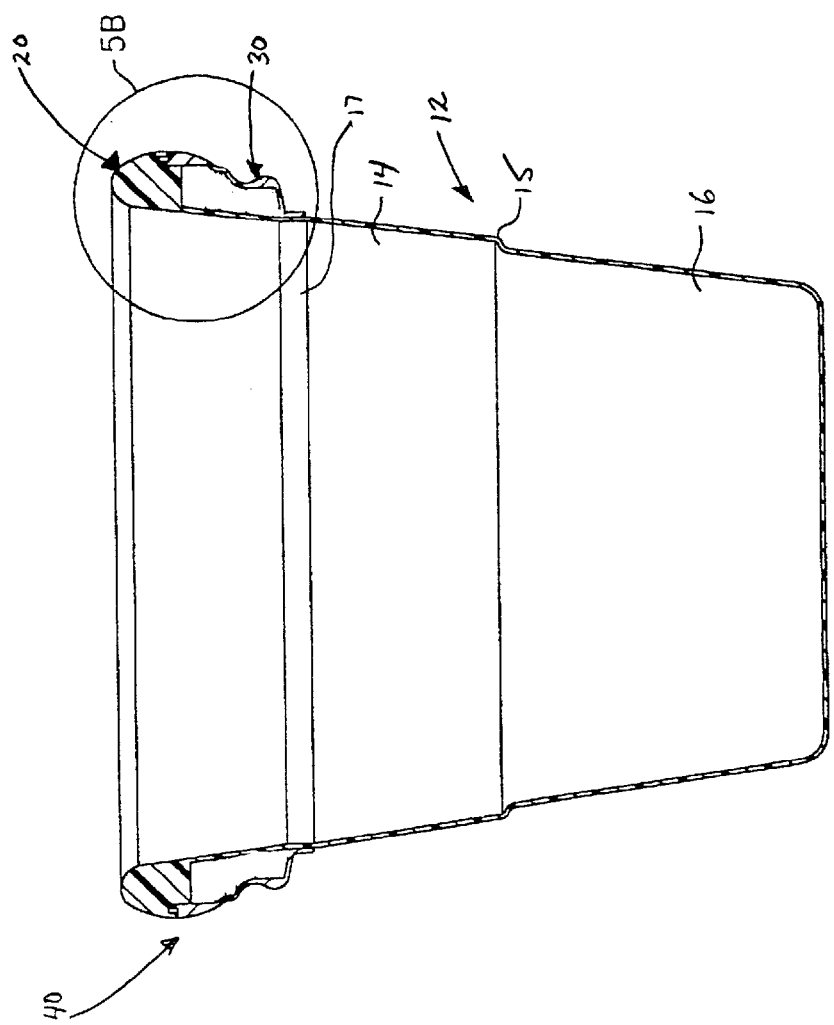
FIG. 5A is front sectional view of the planter showing the collar engaged about the outer periphery of the base.

As best seen in FIGS. 2, 5A and 5B, collar 30 is dimensioned to engage flange 20 to form decorative rim 40 disposed about the outer periphery of base 12. More particularly, collar 30 includes an upwardly projecting rib 36 which is dimensioned to be received within groove 29 of flange 20. Preferably, rib 36 and groove 29 engage one another in a snap-fit manner, however, it is contemplated that rib 36 and groove 29 can be engaged in a different mechanical fashion, e.g., adhesively, thermally, by synthetic hook and loop fibers which adhere when pressed together. An example of one such hook and loop fastener is commonly sold under the trademark Velcro®, locking tabs, etc.

In one embodiment, the collar 30 includes a brace 38 which biases against the outer periphery of the upper portion 14 of the base 12 and locks the rib 36 within groove 29. Preferably, the upper portion 14 of base 12 includes a chamfered or beveled section 17 which promotes friction-fit engagement of the brace 38 against base 12, which, in turn, secures the rib 36 within groove 29 and prevents slippage of the collar 30 from base 12.

The present invention also relates to a method of manufacturing a planter 10 which includes the steps of:
 a) forming a base 12 having upper and lower portions, 14 and 16, respectively, and a flange 20 disposed about the outer periphery of the upper portion 14;
 b) forming a collar 30 dimensioned to encompass the upper portion 14 of the base 12, the collar 30 having a mechanical interface, e.g., rib 36, dimensioned to mechanically engage the flange 20; and
 c) engaging the collar 30 and the flange 20 to form a decorative rim 40 about the upper portion 14 of the base 12.

As can be appreciated, manufacturing the planter 10 in two distinct parts (collar 30 and base 12) greatly simplifies the manufacturing process especially for complex, i.e., more decorative, planters 10. For example, the collar 30 can be separately molded in a variety of sophisticated and complex patterns and shapes by injection molding, extrusion, thermal molding or the like, and then attached to the base 12 during assembly of the planter 10. This eliminates the step of rolling the upper portion 14 of the base 12 to form a decorative rim and/or eliminates subsequently forming, carving and/or cutting a decorative rim 40 in the upper portion 14 of the base 12. It also eliminates the step of setting or securing the distal end of the collar against the base.

In one particular method, at least one of the first and/or second forming steps includes a molding process, e.g., injection or thermal molding. For example, the second step of forming the collar 30 may include a molding process and the engaging step may be performed prior to the collar 30 being completely cured. It is contemplated that this may enhance the mechanical interface between the collar 30 and the base 12.

From the foregoing and with reference to the various figure drawings, those skilled in the art will appreciate that certain modifications can also be made to the present disclosure without departing from the scope of the present disclosure. For example, although it is envisioned that base 10 and collar 30 are generally annular in shape, base 12 and collar 30 can be formed in other polygonal shapes depending upon a desired look or particular purpose, e.g., rectangular, oval, triangular. Moreover, it is not necessary that both the base 12 and the collar 30 be similarly geometrically shaped so long as a portion of the collar 30 engages a portion of the base 12 in a relatively secure manner to form the decorative rim 40.

In one embodiment, the outer periphery of the base 12 includes a reduced diameter section 15 which highlights the transition from the upper portion 14 to the lower portion 16 and enhances the aesthetic appeal of the planter 10. It is also contemplated that the collar 30 can be selectively removable from the base 12 to enable a consumer to easily vary the style, appearance and/or shape of the decorative rim 40 depending upon a particular preference. For example, it is contemplated that different collars 30 having various contours, shapes and/or patterns can be easily and selectively removed and interchanged with the base 12 depending upon a particular season, holiday or consumer preference.

Although only one embodiment of the presently disclosed planter has been illustrated herein, it is not intended that the disclosure be limited thereto. Therefore, the above description should not be construed as limiting, but merely as exemplifications of preferred embodiments. Those skilled in the art will envision other modifications within the scope and spirit of the claims appended hereto.

What is claimed is:

1. A planter, comprising:
 a base having upper and lower portions;
 a flange disposed about the outer periphery of said upper portion, said flange including:
  a top surface which projects generally radially from the upper portion of said base and
  a side overhanging lip which depends downwardly from the top surface, said side overhanging lip defining a groove therein between said side overhanging lip and said upper portion of said base;
 a collar dimensioned to slide over said lower portion of said base to encompass said upper portion of said base, said collar having a mechanical interface dimensioned to mechanically engage said groove of said flange such that both said collar and said top surface of said flange form a decorative rim about said upper portion of the base.

2. A planter according to claim 1 wherein said collar mechanically engages said flange in a snap-fit manner.

3. A planter according to claim 1 wherein said groove mechanically engages a corresponding rib extending from said collar.

4. A planter according to claim 1 wherein said collar includes a brace which holds said collar in engagement against said base.

5. A planter according to claim 4 wherein said base includes a chamfered section disposed about the outer periphery thereof and said brace biases said collar against said chamfered section to secure said collar in mechanical engagement with said flange.

6. A planter according to claim 1 wherein said collar includes an outer-facing surface which is contoured.

7. A planter according to claim 1 wherein a plurality of support struts are disposed about the outer periphery of said base between said base and said flange.

8. A planter according to claim 1 wherein said flange and said collar are annular.

9. A method of forming a planter, comprising the steps of:
   a) forming a base having upper and lower portions and a flange disposed about the outer periphery of said upper portion, said flange including
      a top surface which projects generally radially from the upper portion of said base and
      a side overhanging lip which depends downwardly from said top surface, said side overhanging lip defining a groove therein between said side overhanging lip and said upper portion of said base;
   b) forming a collar dimensioned to slide over said lower portion of said base to encompass said upper portion of said base, said collar having a mechanical interface dimensioned to mechanically engage said groove of said flange such that both said collar and the top surface of said flange form a decorative rim about said upper portion of the base; and
   c) engaging said collar and said flange to form a decorative rim about said upper portion of said base.

10. A method according to claim 9 wherein said collar mechanically engages said flange in a snap-fit manner.

11. A method according to claim 9 wherein the flange of said first forming step includes a lip which projects from said flange to define a groove between said flange and said lip, said groove dimensioned to mechanically engage a corresponding rib extending from said collar of said second forming step.

12. A method according to claim 9 wherein said collar of said second forming step includes a brace which biases said collar against said base to hold said collar in mechanical engagement with said flange.

13. A method according to claim 9 wherein said base includes a plurality of support struts disposed about the outer periphery of said base between said base and said flange.

14. A method according to claim 9 wherein one of said first and second forming steps includes a molding process.

15. A method according to claim 9 wherein said second forming step includes a molding process and said engaging step is performed prior to said collar being completely cured.

* * * * *